(12) United States Patent
Jöngren et al.

(10) Patent No.: US 9,258,041 B2
(45) Date of Patent: *Feb. 9, 2016

(54) METHODS AND SYSTEMS FOR COMBINED CYCLIC DELAY DIVERSITY AND PRECODING OF RADIO SIGNALS

(71) Applicant: TELEFONAKTIEBOLAGET L M ERICSSON (PUBL), Stockholm (SE)

(72) Inventors: George Jöngren, Sundbyberg (SE); Bo Göransson, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,805

(22) Filed: May 12, 2015

(65) Prior Publication Data

US 2015/0244435 A1    Aug. 27, 2015

Related U.S. Application Data

(63) Continuation of application No. 14/184,164, filed on Feb. 19, 2014, now abandoned, which is a continuation of application No. 13/304,870, filed on Nov. 28, 2011, now Pat. No. 8,693,566, which is a continuation of (Continued)

(30) Foreign Application Priority Data

Feb. 13, 2007   (SE) ...................................... 0700367

(51) Int. Cl.
*H04B 7/04*      (2006.01)
*H04B 7/06*      (2006.01)

(Continued)

(52) U.S. Cl.
CPC ............ *H04B 7/0426* (2013.01); *H04B 7/0465* (2013.01); *H04B 7/068* (2013.01);
(Continued)

(58) Field of Classification Search
CPC .... H04B 7/0426; H04B 7/0671; H04B 7/068; H04L 5/0023
See application file for complete search history.

(56) References Cited

U.S. PATENT DOCUMENTS 8,068,555 B2   11/2011  Jöngren et al.
8,693,566 B2    4/2014  Jöngren et al.
(Continued)

FOREIGN PATENT DOCUMENTS

| EP | 1648097 A2 | 4/2006 |
|---|---|---|
| WO | 2007111449 A1 | 10/2007 |
| WO | 2007/139305 A2 | 12/2007 |

OTHER PUBLICATIONS

QUALCOMM Europe, "CDD Based Precoding for DL MIMO," 3GPP TSG-RAN WG1 #48, R1-070655, Feb. 12-16, 2007, St. Louis, USA, XP050104691.

(Continued)

*Primary Examiner* — Leon Flores
(74) *Attorney, Agent, or Firm* — Patent Portfolio Builders PLLC (57) ABSTRACT

In a transmitter or transceiver, signals can be precoded by multiplying symbol vectors with various matrices. For example, symbol vectors can be multiplied with a first column subset of unitary matrix which spreads symbols in the symbol vectors across virtual transmit antennas, a second diagonal matrix which changes a phase of the virtual transmit antennas, and a third precoding matrix which distributes the transmission across the transmit antennas.

20 Claims, 9 Drawing Sheets

Related U.S. Application Data application No. 12/029,548, filed on Feb. 12, 2008, now Pat. No. 8,068,555, which is a continuation of application No. PCT/SE2008/050161, filed on Feb. 12, 2008.

(51) Int. Cl.
  *H04L 25/03* (2006.01)
  *H04L 5/00* (2006.01)
  *H04L 27/26* (2006.01)

(52) U.S. Cl.
  CPC .......... *H04B 7/0617* (2013.01); *H04B 7/0671* (2013.01); *H04B 7/0697* (2013.01); *H04L 5/0023* (2013.01); *H04L 25/03898* (2013.01); *H04L 27/2626* (2013.01); *H04L 27/2647* (2013.01)

(56) References Cited

U.S. PATENT DOCUMENTS

| | | | |
|---|---|---|---|
| 2006/0067421 | A1 | 3/2006 | Walton, Jr. et al. |
| 2007/0041464 | A1* | 2/2007 | Kim et al. ............ 375/267 |
| 2008/0192849 | A1* | 8/2008 | Kim et al. ............ 375/260 |
| 2008/0205533 | A1* | 8/2008 | Lee et al. ............ 375/260 |
| 2008/0247364 | A1 | 10/2008 | Kim et al. |
| 2012/0082202 | A1 | 4/2012 | Jöngren et al. |

OTHER PUBLICATIONS

Ericsson, "High Delay CDD in Rank Adapted Spatial Multiplexing Mode for LTE DL," 3GPP TSG-RAN WG1 #49, R1-072461, May 7-11, 2007, Kobe, Japan, XP050106177.

QUALCOMM Europe, "CDD Precoding for 4Tx Antennas," 3GPP TSG-RAN WG1 #49, R1-072019, May 7-11, 2007, Kobe, Japan, XP050105775.

LG Electronics, "Link-level Evaluation of the CDD-based Precoding under Open-loop Scenario," 3GPP TSG RAN WG1 Meeting #49bis, R1-072871, Jun. 25-29, 2007, Orlando, Florida, USA, XP050106551.

Samsung, "Further Considerations of CDD Precoding," 3GPP TSG RAN WG1 Meeting #49bis, R1-073097, Jun. 25-29, 2007, Orlando, Florida, USA, XP050106749.

Extended European Search Report issued in corresponding European application No. 08712791.6, date of mailing Sep. 16, 2013.

U.S. Appl. No. 60/888,494, filed Feb. 6, 2007.

Dahlman, E., et al., "3G Evolution: HSPA and LTE for Mobile Broadband," First Edition, 2007, pp. 328-333; 336-339; and 381-382.

Love, D. J., et al., "Limited Feedback Unitary Precoding for Spatial Multiplexing Systems," IEEE Transactions on Information Theory, vol. 51, No. 8, Aug. 2005, pp. 2967-2976.

Texas Instruments, "Codebook Design for E-UTRA MIMO Pre-Coding," 3GPP TSG RAN WG1 #46bis, R1-062650, Oct. 2006, pp. 1-8.

LG Electronics, Samsung, NTT-DoCoMo, "Precoding for E-UTRA Downlink MIMO," 3GPP TSG RAN WG1 #47bis, Jan. 2007, R1-070236, pp. 1-3.

QUALCOMM Europe, "Link Analysis of Layer Permutation and No Layer Permutation," 3GPP TSG RAN WG1 #46bis, Oct. 2006, R1-062697, pp. 1-6.

Written Opinion issued in corresponding International application No. PCT/SE2008/050161, date of mailing Jul. 14, 2008.

International Search Report issued in corresponding International application No. PCT/SE2008/050161, date of mailing Jul. 14, 2008.

Dammann, A., et al., "Transmit/Receive Antenna Diversity Techniques for OFDM Systems," European Transactions on Telecommunications (ETT) 2002, vol. 13, No. 5, pp. 531-538.

Samsung; "Precoding for MIMO spatial multiplexing and transmit diversity"; 3GPP TSG RAN WG1 Meeting #46; R1-062529; Oct. 9-13, 2006; pp. 1-11; Seoul, Korea.

LG Electronics, Samsung, NTT-DoCoMo; "CDD-based Precoding for E-UTRA downlink MIMO"; 3GPP TSG RAN WG1 Meeting #47; R1-063345; pp. 1-6; Nov. 6-10, 2006; Riga, Latvia.

\* cited by examiner

FIG. 9

METHODS AND SYSTEMS FOR COMBINED CYCLIC DELAY DIVERSITY AND PRECODING OF RADIO SIGNALS

RELATED APPLICATIONS

This application is a continuation application of U.S. patent application Ser. No. 14/184,164, filed Feb. 19, 2014, which is a continuation application Ser. No. of 13/304,870, filed Nov. 28, 2011; which is a continuation application Ser. No. of 12/029,548, filed Feb. 12, 2012, which was patented as U.S. Pat. No. 8,062,555 on Nov. 29, 2011, which is a continuation of PCT/SE 2008/050161, filed Feb 12, 2008; which claims priority and benefit from Swedish Application No. 0700367-6, filed Feb 13, 2007, the entire teachings of which are incorporated herein by reference.

TECHNICAL FIELD

The present invention generally relates to radio communication systems, devices, software and methods and, more particularly, to mechanisms and techniques for combining precoding and cyclic delay diversity associated therewith.

BACKGROUND

At its inception radio telephony was designed, and used for, voice communications. As the consumer electronics industry continued to mature, and the capabilities of processors increased, more devices became available use that allowed the wireless transfer of data between devices and more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users (and with more tolerable delay).

Even as new network designs are rolled out by network manufacturers, future systems which provide greater data throughputs to end user devices are under discussion and development. For example, the so-called 3GPP Long Term Evolution (LTE) standardization project is intended to provide a technical basis for radiocommunications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

Another interesting feature of LTE is its support for multiple antennas at both the transmit side and the receive side. This provides the opportunity to leverage several different techniques to improve the quality and/or data rate of received radio signals. Such techniques include, for example, diversity against fading (e.g., spatial diversity), shaping the overall antenna beam to maximize gain in the direction of the target (beamforming), and the generation of what can be seen as multiple, parallel "channels" to improve bandwidth utilization (spatial multiplexing or multi-input multi-output (MIMO)).

Precoding is a popular technique used in conjunction with multi-antenna transmission. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel. Sequences of symbol vectors thus form a set of parallel symbol streams and each such symbol stream is referred to as a "layer". Thus, depending on the choice of precoder in a particular implementation, a layer may directly correspond to a certain antenna or a layer may, via the precoder mapping, be distributed onto several antennas.

Cyclic delay diversity (CDD) is a form of open-loop precoding in which the precoding matrix is intentionally varied over the frequency within the transmission (or system) bandwidth. Typically, this is realized by introducing different cyclic time delay for the different antennas, or alternatively realized by varying the phase of the transmitted signals from the different antennas. This kind of phase shift means that the effective channel, comprising the true channel and the CDD precoding, varies faster over frequency than the original channel. By distributing the transmission over frequency, this kind of artificially induced frequency-selectivity is useful in achieving frequency diversity.

One of the more significant characteristics of the radio channel conditions to consider in the context of high rate, multi-antenna transmission is the so-called channel rank. Generally speaking, the channel rank can vary from one up to the minimum of number of transmit and receive antennas. For example, given a 4×2 system as an example, i.e., a system with four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving for using as many layers as the channel rank.

Figure 1:
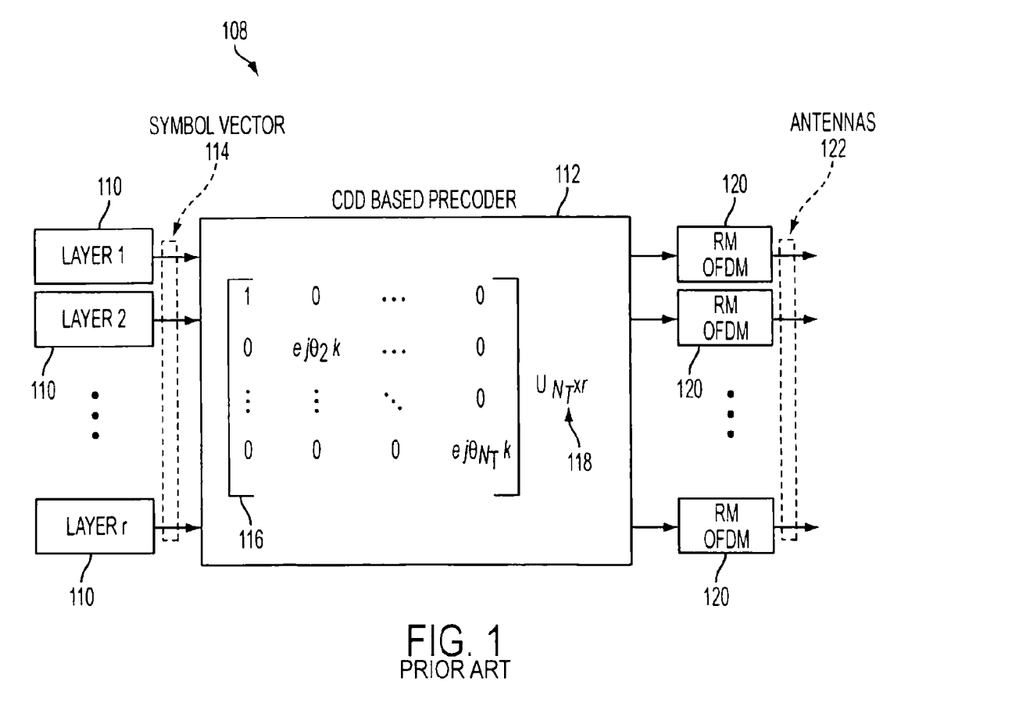
FIG. 1 illustrates a transmission structure including a conventional precoder.

FIG. 1 illustrates a transmission structure 108 for combining CDD and, possibly channel dependent, precoding. Therein, each layer 110 created by the transmitter presents a stream of information carrying modulation symbols to the CDD based precoder 112 as a sequence of symbol vectors 114. The CDD precoder 112 applies the two matrices 116 and 118 illustrated therein to each incoming symbol vector to perform the precoding process. More specifically, the CDD precoder 112 first applies the matrix $U_{N_T \times r}$ 118 to the symbol vector 114, followed by the diagonal CDD matrix 116. $U_{N_T \times r}$ matrix 118 is a column subset of a (possibly scaled) unitary matrix, r denotes the transmission rank and $N_T$ is the number of transmit antennas in the transmitting device. The notation $A_{k \times l}$ means a matrix A having k rows and l columns. The diagonal CDD matrix 116 has non-zero values along the diagonal including an antenna phase shift value θ indexed by a parameter k which may be a function of frequency. If OFDM is used for the transmission, k may e.g. represent the subcarrier index or the closely related data resource element index (which excludes resource elements containing reference symbols). It should also be noted that k may be a more arbitrary function of the position of the resource elements on the resource grid in OFDM. The resulting, precoded modulation symbol vector is then output for, e.g., resource mapping and OFDM modulation 120, prior to being transmitted via antennas 122 (also referred to as antenna ports).

The transmission structure 108 illustrated in FIG. 1 can be utilized in several ways. For example, one option is to use a fixed, channel independent, unitary matrix $U_{N_T \times r}$ 118 with a certain number of columns r corresponding to the transmission rank. The unitary matrix 118 serves to distribute each symbol on all antennas 122, while the diagonal CDD matrix 116 varies (shifts) the phase of each antenna 122. This increases the frequency selectivity of the effective channel each layer 110 experiences which, as mentioned above, can be useful for achieving frequency diversity (as well as multiuser diversity when frequency domain scheduling is used).

There are, however, certain problems associated with using the transmission structure 108 illustrated in FIG. 1 to perform precoding. The spatial correlation properties vary as a function of k and these variations need to be fast in order to ensure sufficient frequency diversity over even rather narrowband transmissions. This makes it difficult for a receiver to estimate the properties of interference stemming from such kind of transmissions. The transmission structure 108 also does not provide sufficient freedom to design the precoding onto the antenna ports. Furthermore, considering for example a r=1 rank one transmission, the transmission structure 108 will inherently use one column of the $U_{N_T \times r}$ matrix 118 to apply to the incoming symbol vector 114. This column would for example (in a two transmit antenna scenario) be equal to [1, 1]. Thus, this column together with the diagonal CDD matrix 116, forms a frequency selective beamformer which may be varied in a periodic fashion over the scheduled bandwidth. The period will depend on the selected speed of the phase variations. However, such beamforming may be problematic because, if the MIMO channel is correlated at the transmit side, severe cancellation of signals may occur at some frequencies. If the coding rate is not low enough over the scheduled bandwidth, this will in turn result in communication errors. Similar cancellation can occur even for transmission ranks greater than one. So, generally, it will be difficult to use high coding rates in conjunction with the transmission structure 108 (and its technique for precoding) if the scheduled bandwidth is over a significant portion of the previously mentioned beamformer period. Such a scenario, however, typically occurs when large delay CDD is used, i.e., corresponding to fast phase shift variations in the frequency domain.

Accordingly, it would be desirable to provide precoding systems, methods, devices and software which avoid the afore-described problems and drawbacks.

SUMMARY

According to one exemplary embodiment, a method for transmitting information signals having a plurality of symbol vectors associated therewith on a radio channel includes precoding the symbol vectors by multiplying the symbol vectors with: a first column subset of a unitary matrix which spreads symbols in the symbol vectors across all virtual transmit antennas, a second diagonal matrix which changes a phase of the virtual transmit antennas, and a third precoding matrix which distributes transmit energy across physical transmit antennas, further processing the precoded symbol vectors to generate the information signals, and transmitting the information signals.

According to another exemplary embodiment, a transmitter for transmitting information signals having a plurality of symbol vectors associated therewith on a radio channel includes: a plurality of physical transmit antennas, a processor for precoding the symbol vectors by multiplying the symbol vectors with: a first column subset of a unitary matrix which spreads symbols in the symbol vectors across all virtual transmit antennas, a second diagonal matrix which changes a phase of the virtual transmit antennas, and a third precoding matrix which distributes transmit energy across the physical transmit antennas, and for further processing the precoded symbol vectors to generate the information signals; and a transmit chain of elements for transmitting the information signals.

According to another exemplary embodiment, a method for equalizing received information signals having a plurality of symbol vectors associated therewith includes forming a channel estimate associated with the received information signals by multiplying an initial channel estimate with a plurality of matrices, the plurality of matrices including: a first column subset of a unitary matrix, a second diagonal matrix, and a third precoding matrix, and equalizing the information signals using the formed channel estimate.

According to another exemplary embodiment, a processor forms a channel estimate associated with received information signals by multiplying an initial channel estimate with a plurality of matrices, the plurality of matrices including: a first column subset of a unitary matrix, a second diagonal matrix, and a third precoding matrix, and wherein the processor uses the formed channel estimate to equalize the received information signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

As mentioned above, the transmission structure 108 illustrated in FIG. 1 and, more particularly, the CDD precoder 112, suffer from certain drawbacks when considering its applicability in the context of matrices 118 which are channel independent. In addition to the problem described in the Background section, another problem with the transmission structure 108 can occur if channel dependent precoding is to be used in conjunction with CDD. Since the diagonal CDD matrix 116 is applied to the symbol vector 114 before the, in this example, channel dependent precoding matrix 118, the precoding matrix 118 will then need to deal with a more frequency-selective effective channel, i.e., comprising the true channel and the applied CDD diagonal matrix 118. In order to ensure an effective precoding scheme under these circumstances, the precoder 112 must then switch the elements representing matrix 118 at a finer frequency granularity than if only the original channel was present. This, in turn, may lead to substantially higher signaling overhead because the precoder elements which are used to precode transmitted symbols are typically identified to the receiver in the form additional (overhead) signaling.

Figure 5:
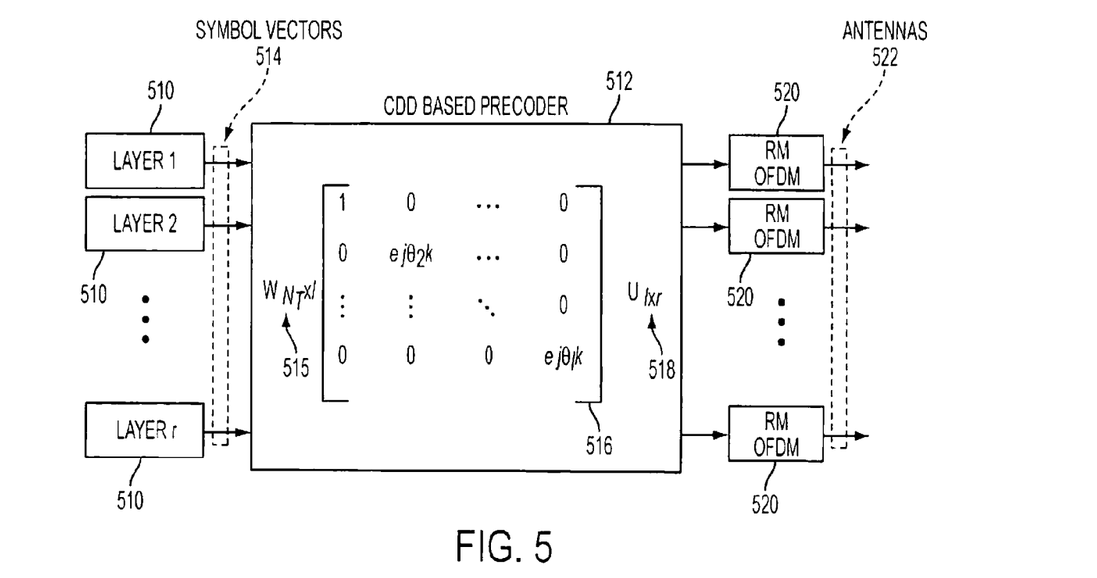
FIG. 5 illustrates a transmission structure including a precoder according to an exemplary embodiment.

According to exemplary embodiments these problems are addressed by providing a different transmission structure in which, for example, an additional (channel dependent or channel independent) precoder element is applied to the symbol vector output from the CDD operation comprising application of diagonal CDD matrix and column subset of a channel independent unitary matrix as described above. This can be seen by, for example, noting the additional matrix 515 in FIG. 5, where for future reference, it should be noted that the symbol vector after application of the diagonal CDD matrix is referred to as virtual antennas. The resulting vector x(k) transmitted on a resource indexed by k can thus be written as $$x(k) = W_{N_T \times l}(k) D(k)_{l \times r} s(k) \quad (1)$$

where D(k) is the second diagonal CDD matrix 516 and it is emphasized that the third precoding matrix 515, $W_{N_T \times l}(k)$, may potentially be different for different values of k. The parameter l would here typically be set to equal the transmission rank r. These exemplary embodiments can be used to, for example, add a channel dependent precoding stage directly at the input of the true channel (i.e., outputting onto the antenna ports), which in turn allows CDD to be combined with channel dependent precoding without requiring finer precoding granularity, thus saving signaling overhead. Even if the third precoding matrix is not channel dependent, the structure indicated by the exemplary embodiments provides additional freedom in selecting suitable precoders for the third precoding stage so as to avoid some of the previously mentioned problems associated with the use of the structure 108.

Figure 2:
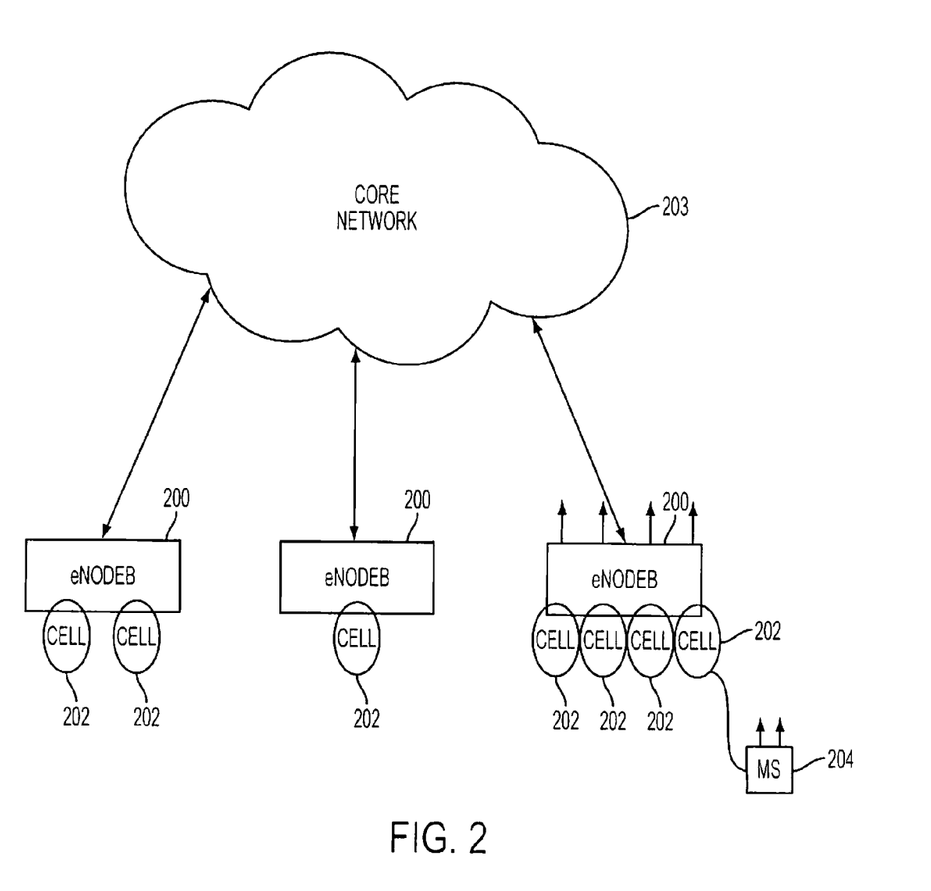
FIG. 2 illustrates an exemplary LTE access network in which exemplary embodiments can be implemented.
Figure 3:
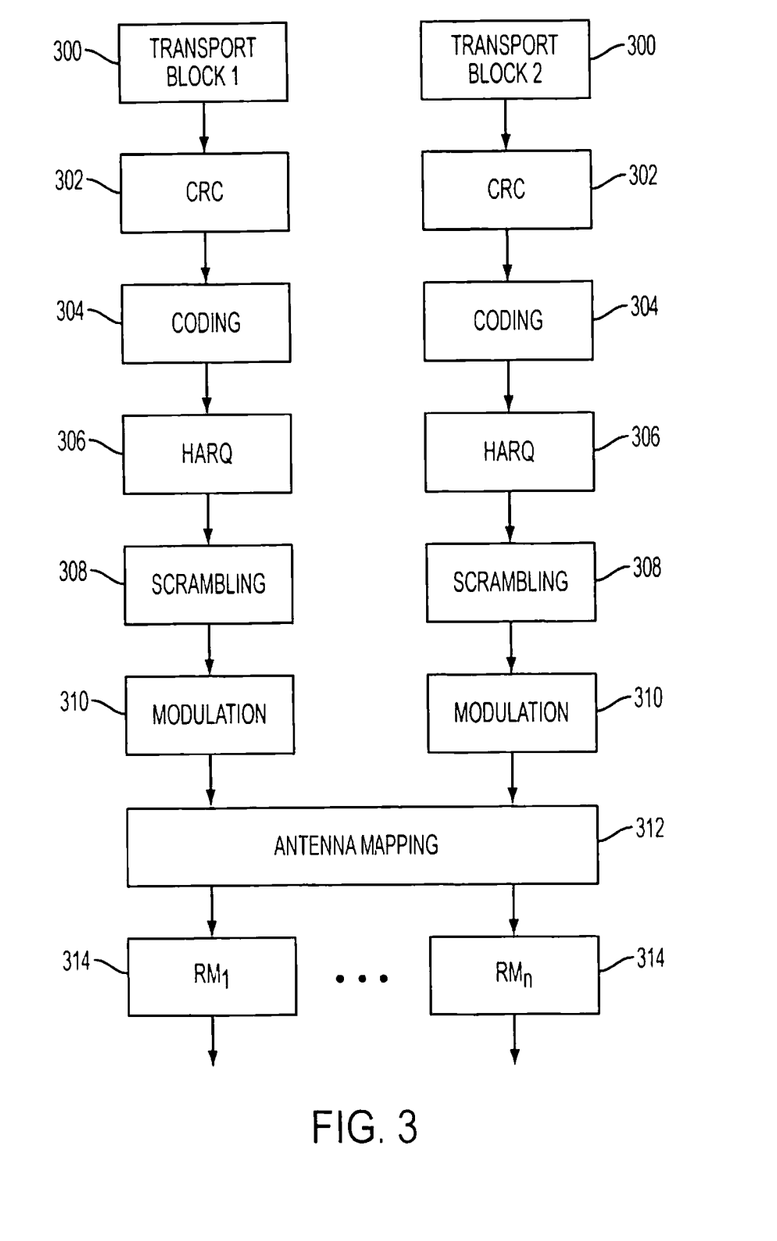
FIG. 3 depicts exemplary LTE physical layer information signal processing with which exemplary embodiments can be associated.
Figure 4:
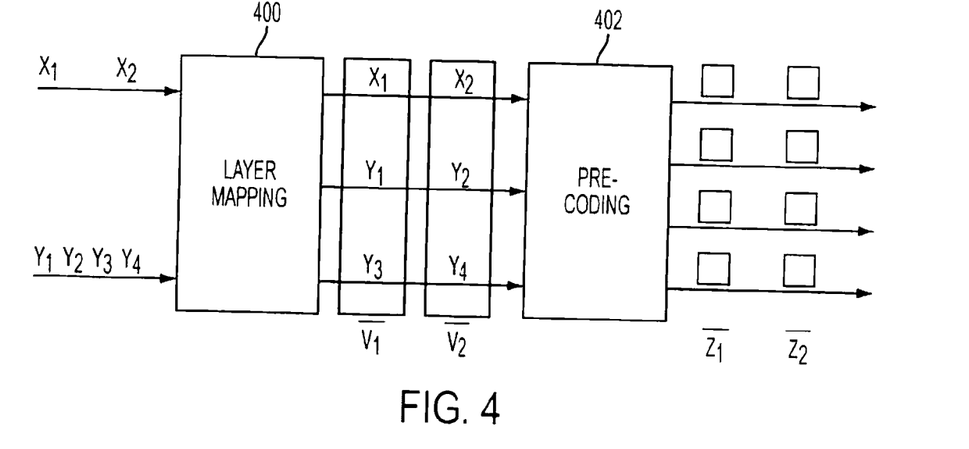
FIG. 4 shows an example of an antenna mapping function in more detail.

To provide some context for the more detailed discussion of combined CDD and precoding according to these exemplary embodiments, consider first the exemplary radiocommunication system illustrated in FIGS. 2-4. Beginning with the radio access network nodes and interfaces in FIG. 2, it will be seen that this particular example is provided in the context of LTE systems. Nonetheless, the present invention is not limited in its applicability to transmitters or transmissions associated with LTE systems and can instead be used in any system wherein multiple transmit antennas and precoding are employed, including, but not limited to Wideband Code Division Multiple Access (WCDMA), GSM, UTRA, E-UTRA, High Speed Packet Access (HSPA), UMB, WiMaX and other, systems, devices and methods. Since, however, the example in FIG. 2 is provided in terms of LTE, the network node which transmits and receives over the air interface is termed an eNodeB, several of which eNodeBs 200 are illustrated therein.

In the context of the air interface, each eNodeB 200 is responsible for transmitting signals toward, and receiving signals from, one or more cells 202. Each eNodeB includes multiple antennas, e.g., 2, 4, or more transmit antennas, and handles functions including, but not limited to coding, decoding, modulation, demodulation, interleaving, deinterleaving, etc., with respect to the physical layer of such signals. Note that the phrase "transmit antennas" as used herein is specifically meant to include, and be generic to, physical antennas, virtual antennas and antenna ports. The eNodeBs 200 are also responsible for many higher functions associated with handling communications in the system including, for example, scheduling users, handover decisions, and the like. The interested reader who desires more information regarding transmit or receive functions associated with LTE or other systems in which these exemplary embodiments may be deployed is directed toward the book entitled "3G Evolution—HSPA and LTE for Mobile Broadband", to Erik Dahlman et al., published by Elsevier Ltd., 2007, the disclosure of which is incorporated by reference.

Nonetheless, to briefly discuss the baseband processing associated with the transmission of signals in the downlink (i.e., possibly transferred through the core network 203 to an eNodeB 200 and then into the cells 202 toward target mobile terminal or stations, e.g., MS 204 in FIG. 2), consider FIG. 3. Therein, two transport blocks of data 300 are being processed for transmission by an eNodeB 200 using spatial multiplexing. Cyclic redundancy check (CRC) bits are inserted at steps 302 to be used by the receiver to detect errors. Channel coding is applied to the transport blocks at steps 304 to provide protection to the payload data against the impairments presented by the radio channel. The hybrid automatic retransmission request (HARQ) steps 306 operate to extract or repeat code bits from the blocks of code bits provided by the channel encoder to generate a precise set of bits to be transmitted within a transmit time interval (TTI), e.g., based upon various criteria such as the number of assigned resource blocks, the selected modulation scheme and the spatial multiplexing order.

At step 308, the code words output from the HARQ block are scrambled (multiplied) by a bit-level scrambling sequence or mask, which aids the receive in suppressing interference to the radio signal. The selected data modulation, e.g., Quadrature Phase-Shift Keying (QPSK), 16 Quadrature Amplitude Modulation (QAM), or 64 QAM, is then applied at step 310 to transform blocks of scrambled bits into corresponding blocks of modulation symbols. These modulation symbols are then mapped to different antennas and/or different antenna ports at step 312. In LTE nomenclature, an antenna port corresponds to the transmission of a particular downlink reference signal which may, or may not, correspond to an actual, physical antenna. The symbols to be transmitted on each antenna (1-n in FIG. 3, e.g., 2, 4, 8, 16) are then mapped to respective resource blocks 314 and sent off for OFDM processing (not shown) prior to transmission by the eNodeB 200.

Of particular interest in the downlink processing for these exemplary embodiments is the antenna mapping step/block 312. The antenna mapping process can be further subdivided into layer mapping of the codewords output from the modulation block 310 and precoding of the resulting symbol vectors to generate the antenna (or antenna port) mapped symbols, as shown in FIG. 4. Therein an example is provided with two sets of codewords being mapped by layer mapping function 400 into three layers. Two symbol vectors v1 and v2 associated with the three layers are illustrated in FIG. 4. These symbol vectors are then precoded by applying one or more precoding matrices by precoding function 402, i.e., by matrix multiplication of the precoding matrix or matrices with the incoming symbol vectors. According to one exemplary embodiment, the precoding function 402 can apply three different matrices as will be described below with respect to FIG. 5. It will be appreciated that the selections of mapping to three layers and four antennas in FIG. 4 is purely exemplary. Selection of the number of layers will, as described earlier, vary based upon the channel rank (among possibly other criteria) and the number of antennas may vary from system to system or even among transmit devices within systems.

FIG. 5 illustrates a precoder according to exemplary embodiments which can be used to perform precoding, e.g., as described with respect to blocks 312 and 402 above. Therein, each layer 510 created by the transmitter presents a stream of modulation symbols to the CDD based precoder 512 as a sequence of symbol vectors 514. The CDD precoder 512 applies the three matrices 515, 516 and 518 illustrated therein to each incoming symbol vector to perform the precoding process. More specifically, the CDD precoder 512 according to this exemplary embodiment first applies the matrix $U_{l \times r}$ 518, which is a column subset of a possibly scaled unitary lxl matrix, to the symbol vector 514, followed by diagonal CDD matrix 516, followed then by a precoding matrix $W_{N_T \times l}$ 515 resulting in the transmit vector previously given in equation (1).

The columns of the matrix 518 are taken from a possibly scaled unitary matrix. A unitary matrix exhibits the property that its inverse is equal to the complex conjugate transpose of the unitary matrix of interest. Thus, the columns of the matrix 518 are orthogonal and of equal norm. The first applied, matrix 518 operates to spread the symbols across the antenna ports. The second applied CDD matrix 516 will have the qualities of a diagonal matrix, i.e., elements on one diagonal are non-zero and the remaining matrix elements are zero. This CDD matrix 516 operates to vary (shift) the phase of each antenna or antenna port 522. The third applied, precoding matrix 515 operates to distribute the transmission energy across the antennas or antenna ports. It may be determined in either a channel independent manner or based upon, at least in part, current radio channel conditions resulting in a channel dependent precoder operation. As discussed above, application of these matrices to the incoming symbol vectors can be performed by a processing unit within the transmitter by way of matrix multiplication.

The parameter l is introduced in this exemplary embodiment as a size parameter of the three matrices used to perform precoding, i.e., the number of columns in the last applied precoding matrix 515, the number of rows and columns in the second applied, diagonal CDD matrix 516 and the number of rows in the first applied, unitary matrix 518. Thus, unlike the transmission structure illustrated in FIG. 1, the size of the matrices involved in performing precoding according to these exemplary embodiments may vary dynamically for a given transmitter according to the transmission rank of the channel (or the number of layers), e.g., the number of rows in the unitary matrix 518 may be different than the number of transmit antennas. As previously mentioned, the parameter l is typically set equal to the transmission rank r. By way of contrast, the matrices 116 and 118 discussed above with respect to FIG. 1 were fixedly sized to the number of transmit antennas associated with the particular transmitter performing the precoding.

Looking more closely at the three matrices used to perform precoding according to this exemplary embodiment shown in FIG. 5, the matrix $U_{l \times r}$ 518 is, like matrix 118, a column subset of a (possibly scaled) unitary matrix where l denotes the number of rows in the matrix and r denotes the transmission rank and number of columns. The diagonal CDD matrix 516 includes $\exp(j\theta_n k)$ elements along the diagonal wherein $\theta_n$ represents a phase value associated with a particular antenna or antenna port and k is an index associated with a particular resource element (e.g. indices of all subcarriers or indices of only those subcarriers which carry data rather than those which carry reference symbols). The matrix $W_{N_T \times l}$ 515 is a precoding matrix which can have various values, e.g., to perform channel dependent beamforming or precoding in a channel independent manner, some examples of which are described below, and which has a size of $N_T$ (the number of transmit antennas/antenna ports in the transmitting device) by l. The resulting, precoded modulation symbol vector is then output for, e.g., resource mapping and OFDM modulation 520, prior to being transmitted via antennas 522.

According to theses exemplary embodiments, the precoding matrix 515 $W_{N_T \times l}$ is now applied directly on the MIMO channel matrix. This means that, in for example the case of a channel-dependent precoding, $W_{N_T \times l}$ can "see" the true channel which is unaffected by any potential CDD operation. The diagonal CDD matrix and $U_{l \times r}$ can then be used to perform CDD operation on the new, improved, effective channel comprising the true channel and $W_{N_T \times l}$. The number of rows l can moreover be adapted so that CDD operation is only performed among the virtual antennas taken as input to $W_{N_T \times l}$.

For example, for transmission rank one (and therefore, the number of layers is one given that these examples are concerned with spatial multiplexing), l could be set to one, the diagonal matrix would be 1, and $W_{N_T \times l}$ would be one column vector performing possibly channel dependent beamforming. If different $W_{N_T \times l}$ are used for different indices k frequency dependent precoding is possible. Similarly, for transmission rank two, l could be two, $U_{l \times r}$ could have two columns, and $W_{N_T \times l}$ could be channel dependent and have two columns as well. The diagonal matrix together with $U_{l \times r}$ then performs CDD like operation on the virtual antennas, meaning that the two layers see a mixture of the virtual antenna channels which in turn are formed from the true channel and $W_{N_T \times l}$. Thus, the three matrices 515, 516 and 518 could, for example, be selected from the following table:

| Maximum Number of Layers | W | D | U |
|---|---|---|---|
| 1 | $\begin{bmatrix} a \\ b \end{bmatrix}$ | $[1]$ | $[1]$ |
| 2 | $\begin{bmatrix} c & d \\ e & f \end{bmatrix}$ | $\begin{bmatrix} g & 0 \\ 0 & h \end{bmatrix}$ | $\begin{bmatrix} k & l \\ m & n \end{bmatrix}$ |

Therein, variables a, b, c, d, e, f, g, h, k, l, m, and n represent, potentially complex, values which are selected to provide the functions or matrix-types described above, resulting in a so-called precoder codebook. Examples of these values can be found in, for example, the standards specification 3GPP TS 36.211 V1.3.1, (2007-08), at section 6.3.3.2. By using precoding as described above and illustrated in FIG. 5, beamforming on the virtual antennas (antenna ports) spreads energy in designated sub-spaces, which sub-spaces focus the transmission energy toward the intended recipient (e.g., mobile station) of the transmission. Channel independent precoding is also possible in for example the sense of varying the selection of precoders in a more random manner so as to avoid focusing the energy in any particular direction.

According to another exemplary embodiment, a transmission structure could provide for precoding wherein the precoding matrix 515 i.e., $W_{N_T \times l}$, is instead set to be a fixed channel and frequency independent matrix with orthogonal and equal norm columns, the diagonal CDD matrix set to be of size $N_T \times N_T$ (i.e., a square matrix equal to the number of transmit antennas) and the matrix 518 $U_{l \times r}$ can then be a single column of all ones. This exemplary embodiment provides another form of CDD which does not suffer from the previously mentioned cancellation problem when correlated fading is present on the transmit side.

Figure 6:
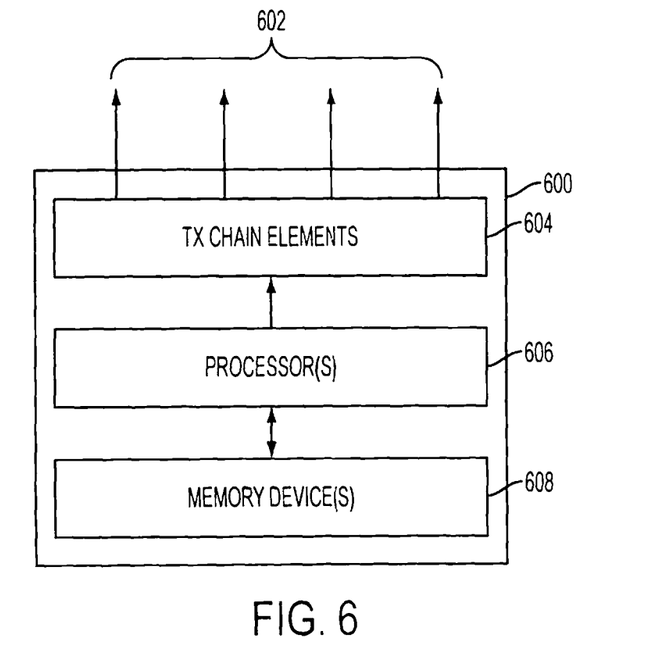
FIG. 6 is a block diagram of an exemplary transmitting device in which precoding according to these exemplary embodiments can be implemented.

As mentioned above, the transmit processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The transmitter may, for example, be disposed within a radio base station, NodeB, eNodeB, or the like, to transmit information signals on a downlink radio channel. Alternatively, the transmitter may, for example, be disposed in a mobile unit, terminal device, user equipment, or the like to transmit information signals on an uplink radio channel. Regardless of the particular type of communication system in which these exemplary embodiments are presented, the transmit device will typically include the components illustrated generally in FIG. 6.

Figure 7:
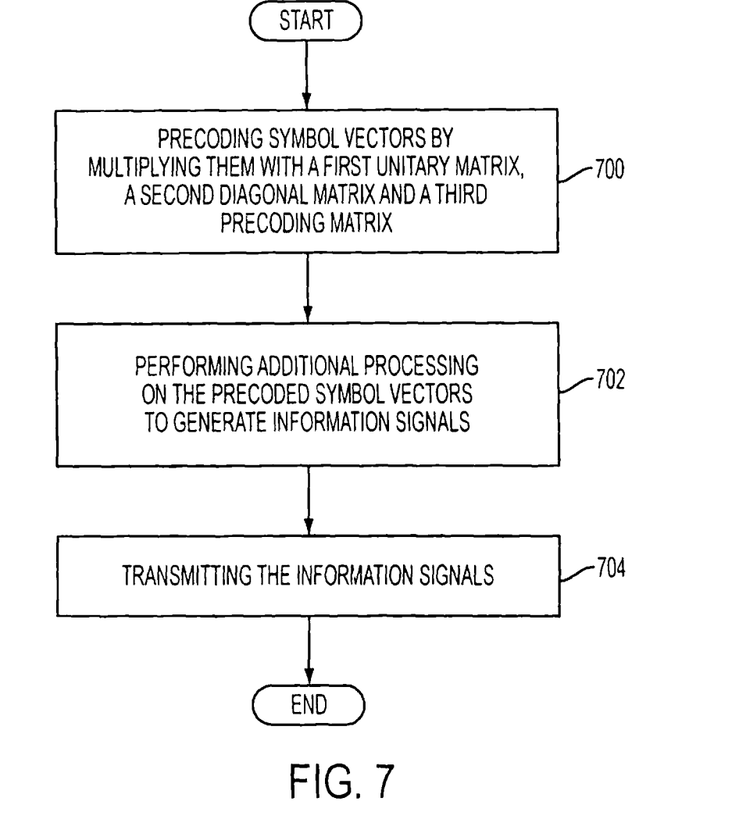
FIG. 7 is a flowchart illustrating a method for transmitting information signals according to an exemplary embodiment.

Therein, the transmitter includes a plurality of physical transmit antennas 602 in this example numbering four, although more or fewer than four transmit antennas can be used. The physical transmit antennas 602 are connected to a processor 606 via transmit (TX) chain elements 604 which can include one or more of filters, power amplifiers and the like, as will be appreciated by those skilled in the art. Processor(s) 606, in conjunction with memory device(s) 608 (and potentially other devices not shown) can operate to perform the transmit processes discussed above with respect to FIGS. 3-5, e.g., by way of software stored therein, additional hardware or some combination of software and hardware. Thus, the precoding functionality described above can, for example, be performed in software by executing computer-readable instructions from memory device 608 to perform the matrix multiplications described above with respect to FIG. 5. Thus, it will be apparent that exemplary embodiments also relate to software, e.g., program code or instructions which are stored on a computer-readable medium and which, when read by a computer, processor or the like, perform certain steps associated with transmitting information signals which are precoded in the manner described above. An example of such steps is illustrated in the flowchart of FIG. 7.

Therein, at step 700, symbol vectors are precoded by multiplying them with a first unitary matrix which spreads symbols in the symbol vectors across the virtual transmit antennas, a second diagonal matrix which changes a phase of the virtual transmit antennas, and a third precoding matrix which distributes the transmission across the transmit antennas. After precoding the symbol vectors, they can undergo further processing at step 702 to generate information signals. For example, such additional signal processing can include mapping precoded symbols to resource blocks to be transmitted via at least one of the transmit antennas and orthogonal frequency division multiplexing (OFDM) the resource blocks, although other processing, e.g., for non-OFDM systems, could alternately be performed downstream of the precoding operation. Then, at step 704, the resultant information signals are transmitted.

Exemplary embodiments also provide for receive side processing of signals which have been transmitted using the foregoing exemplary precoding embodiments. In systems using common pilots (common reference symbols (RS)), the receiver needs to be aware of the transmission structure in order to be able to properly decode the transmission. LTE is one example of such a system where this transmission mode is using common reference symbols and is thus not transparent to the UE. Thus, all of the involved matrices described above (i.e., W, D and U) need to be known on the receive side (e.g., at the UE) to be used for equalizing the channel. For example, the UE may first form the effective channel H_eff=HWDU, where H is a channel estimate obtained from the common RS, equalize the effective channel, e.g. by using a linear filter inv(H_eff^*H_eff)H_eff^*), producing the equalized vector sequence z, which is input to a demodulator, producing soft values of coded bits which are finally input to, e.g., a turbo decoder to produce an estimate of the transmitted information bits.

It will be appreciated that there are numerous implementations for receiving and decoding wirelessly received information symbols and that the foregoing is simply one exemplary implementation. The receive side processing according to these exemplary embodiments will essentially provide a mirrored processing to that performed on the transmit side. The receiver will use its knowledge of the precoding performed by the transmitter to perform its channel estimation/equalization function. Such knowledge on the part of the receiver may be predefined a priori or it may be passed on to the receiver explicitly as part of the transmitted information.

Figure 8:
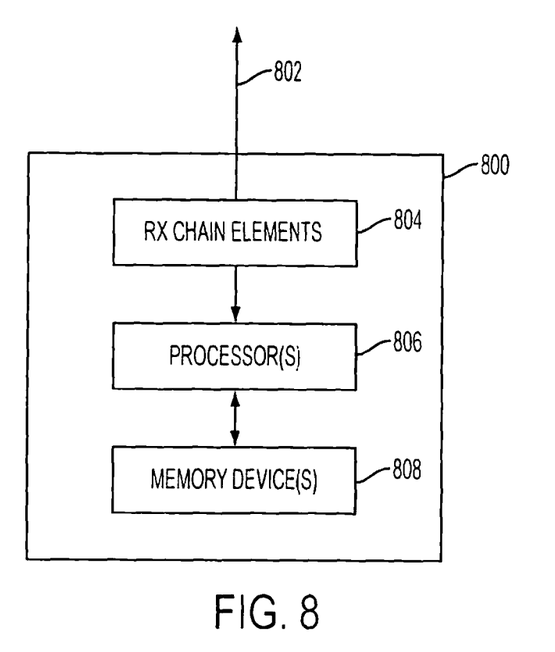
FIG. 8 is a block diagram of an exemplary receiving device in which signals which have been precoded according to these exemplary embodiments can be processed.
Figure 9:
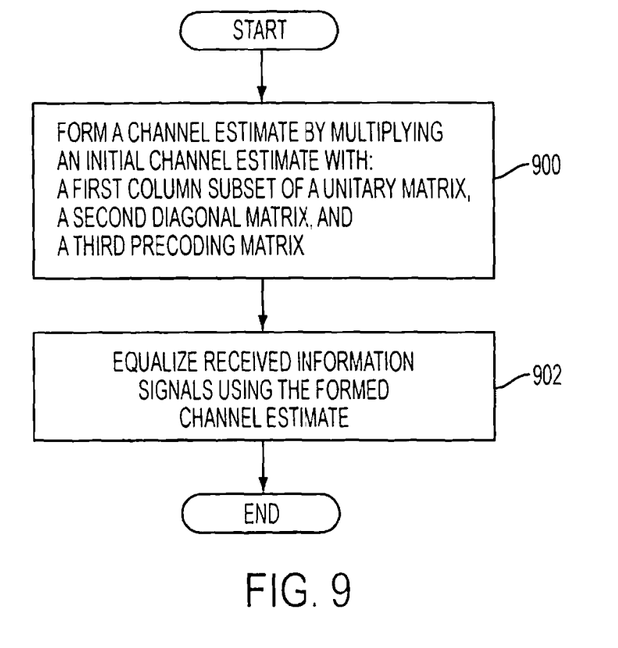
FIG. 9 is a flowchart illustrating a method for processing received information signals according to an exemplary embodiment.

Thus, an exemplary receiver 800 for receiving and processing information signals which have been precoded as described above is illustrated in FIG. 8. Therein, one (or more) receive antennas 802 receive the information signals which have been precoded during transmit side processing. After passing through one or more receive (RX) chain processing elements 804 (e.g., filters, amplifiers or the like), processor(s) 806 will process the received information signals to extract the information contained therein, e.g., in conjunction with processing software stored on memory device(s) 808, by using its knowledge of the precoding performed on those information signals to calculate a channel estimate used in subsequent receive side processing. For example, as shown in the flowchart of FIG. 9, a method for equalizing received information signals includes the steps of forming a channel estimate associated with the received information signals by multiplying an initial channel estimate with a plurality of matrices, the plurality of matrices including a first column subset of a unitary matrix, a second diagonal matrix, and a third precoding matrix at step 900, and equalizing the information signals using the formed channel estimate at step 902.

The foregoing description of exemplary embodiments provides illustration and description, but it is not intended to be exhaustive or to limit the invention to the precise form disclosed. Modifications and variations are possible in light of the above teachings or may be acquired from practice of the invention. For example, the exemplary embodiments also include $W_{N_T \times l}$ and $U_{l \times r}$ matrices of more general form and, potentially, also a more general form of CDD matrix, e.g., not limited to a diagonal matrix. The following claims and their equivalents define the scope of the invention.

The invention claimed is:

1. A transmitter for transmitting information signals having a plurality of symbol vectors associated therewith on a radio channel comprising:
   a plurality of physical transmit antennas;
   means for precoding said symbol vectors by multiplying said symbol vectors with:
      a first column subset of a unitary matrix which spreads symbols in said symbol vectors across virtual transmit antennas,
      a second diagonal matrix which changes a phase of said virtual transmit antennas, and
      a third precoding matrix which distributes transmit energy across said physical transmit antennas,
   and means for further processing said precoded symbol vectors to generate said information signals; and
   means for transmitting said information signals.

2. The transmitter according to claim 1, wherein said physical transmit antennas are antenna ports.

3. The transmitter according to claim 1, wherein said symbol vectors are first multiplied by said first column subset of unitary matrix, next multiplied by said second diagonal matrix and then multiplied by said third precoding matrix.

4. The transmitter according to claim 1, wherein when transmitting using r layers, said third precoding matrix has l columns, said second diagonal matrix has l rows and l columns, said first column subset of unitary matrix has l rows and r columns, and said symbol vectors have r elements.

5. The transmitter according to claim 1, wherein when transmitting using r layers, said third precoding matrix has r columns, said second diagonal matrix has r rows and r columns, said first column subset of unitary matrix is a unitary matrix having r rows and r columns, and said symbol vectors have r elements.

6. The transmitter according to claim 1, wherein said means for further processing further comprises:
   means for mapping precoded symbols to resource blocks to be transmitted via at least one of said transmit antennas; and
   means for distributing said resource blocks over the resource element grid of an orthogonal frequency division multiplexing (OFDM) type of transmission.

7. The transmitter according to claim 1, wherein phase shifts induced by said second diagonal matrix are varied with respect to a parameter that is a function of a position of the resource element used for transmitting a particular symbol vector.

8. The transmitter according to claim 7, wherein said parameter is a subcarrier index.

9. The transmitter according to claim 7, wherein said parameter is a data resource element index.

10. The transmitter according to claim 1, wherein the third precoding matrix performs channel dependent precoding.

11. A non-transitory computer-readable medium storing computer instructions for transmitting information signals having a plurality of symbol vectors associated therewith on a radio channel, wherein when the computer instructions, when executed by a processor, cause the processor to:
   precode said symbol vectors by multiplying said symbol vectors with:
      a first column subset of a unitary matrix which spreads symbols in said symbol vectors across virtual transmit antennas,
      a second diagonal matrix which changes a phase of said virtual transmit antennas, and
      a third precoding matrix which distributes transmit energy across said physical transmit antennas, and for
   further process said precoded symbol vectors to generate said information signals; and
   transmit said information signals over a plurality of physical transmit antennas.

12. The non-transitory computer-readable medium according to claim 11, wherein said physical transmit antennas are antenna ports.

13. The non-transitory computer-readable medium according to claim 11, wherein said symbol vectors are first multiplied by said first column subset of unitary matrix, next multiplied by said second diagonal matrix and then multiplied by said third precoding matrix.

14. The non-transitory computer-readable medium according to claim 11, wherein when transmitting using r layers, said third precoding matrix has l columns, said second diagonal matrix has l rows and l columns, said first column subset of unitary matrix has l rows and r columns, and said symbol vectors have r elements.

15. The non-transitory computer-readable medium according to claim 11, wherein when transmitting using r layers, said third precoding matrix has r columns, said second diagonal matrix has r rows and r columns, said first column subset of unitary matrix is a unitary matrix having r rows and r columns, and said symbol vectors have r elements.

16. The non-transitory computer-readable medium according to claim 11, wherein said further processing further comprises:
   mapping precoded symbols to resource blocks to be transmitted via at least one of said transmit antennas; and
   distributing said resource blocks over the resource element grid of an orthogonal frequency division multiplexing (OFDM) type of transmission.

17. The non-transitory computer-readable medium according to claim 11, wherein phase shifts induced by said second diagonal matrix are varied with respect to a parameter that is a function of a position of the resource element used for transmitting a particular symbol vector.

18. The non-transitory computer-readable medium according to claim 17, wherein said parameter is a subcarrier index.

19. The non-transitory computer-readable medium according to claim 17, wherein said parameter is a data resource element index.

20. The non-transitory computer-readable medium according to claim 11, wherein the third precoding matrix performs channel dependent precoding.

* * * * *

UNITED STATES PATENT AND TRADEMARK OFFICE
CERTIFICATE OF CORRECTION

PATENT NO. : 9,258,041 B2  Page 1 of 1
APPLICATION NO. : 14/709805
DATED : February 9, 2016
INVENTOR(S) : Jöngren et al.

It is certified that error appears in the above-identified patent and that said Letters Patent is hereby corrected as shown below:

IN THE SPECIFICATION

In Column 1, Line 8, delete "2014," and insert -- 2014, now abandoned, --, therefor.

In Column 1, Line 10, delete "2011;" and insert -- 2011; now Pat. No. 8,693,566, --, therefor.

In Column 1, Line 11, delete "Feb. 12, 2012," and insert -- Feb. 12, 2008, --, therefor.

In Column 1, Line 12, delete "U.S. Pat. No. 8,062,555" and insert -- U.S. Pat. No. 8,068,555 --, therefor.

In Column 5, Line 43, in Equation (1), delete "$x(k) = W_{N_T \times l}(k) D(k)_{l \times r} s(k)$," and insert -- $\mathbf{x}(k) = \mathbf{W}_{N_T \times l}(k) \mathbf{D}(k) \mathbf{U}_{l \times r} \mathbf{s}(k)$ --, therefor.

Signed and Sealed this
Thirty-first Day of May, 2016

Michelle K. Lee
*Director of the United States Patent and Trademark Office*